June 10, 1924.
H. M. PATCH
1,497,404
RESILIENT WHEEL
Filed Nov. 15 1921
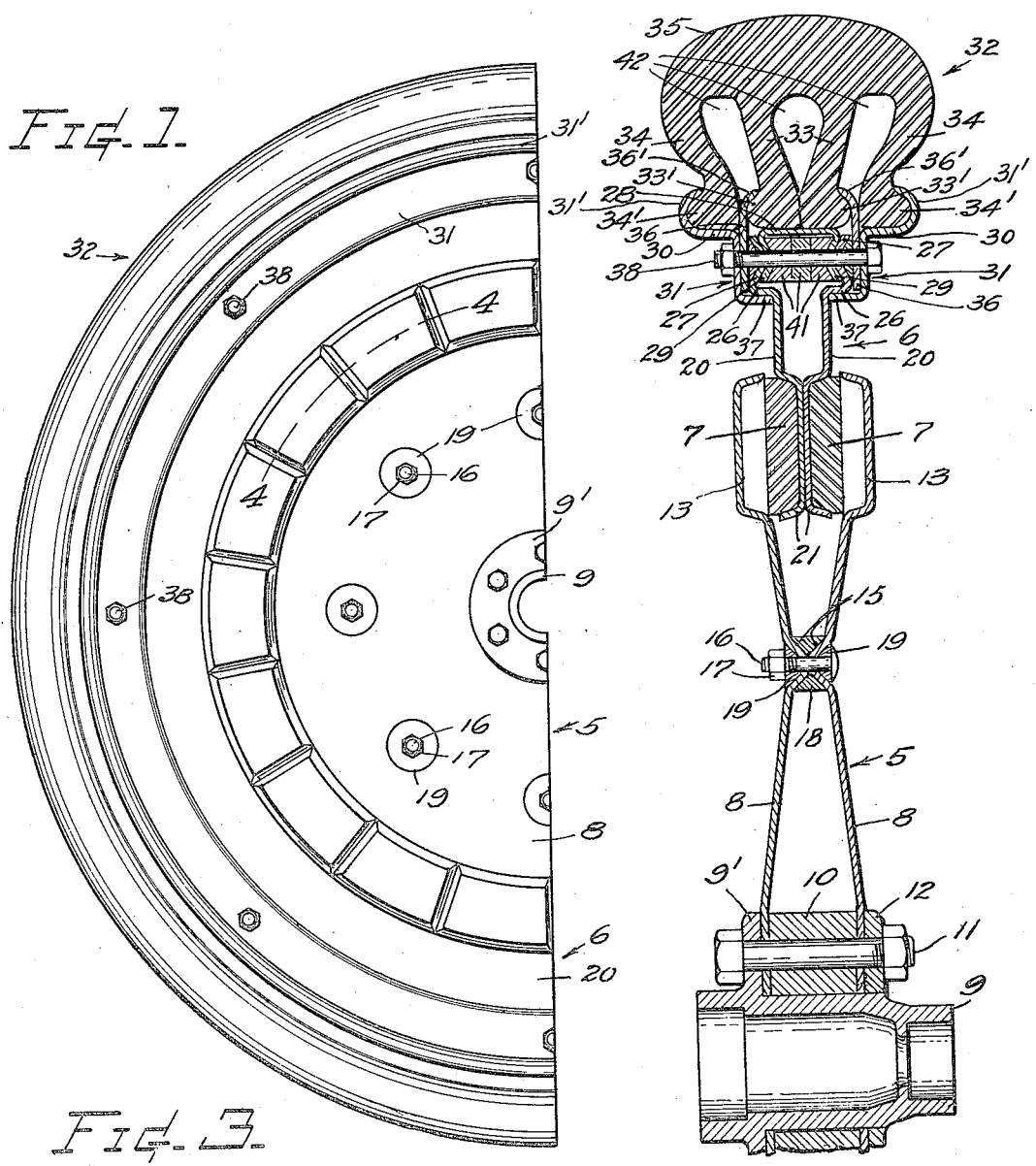
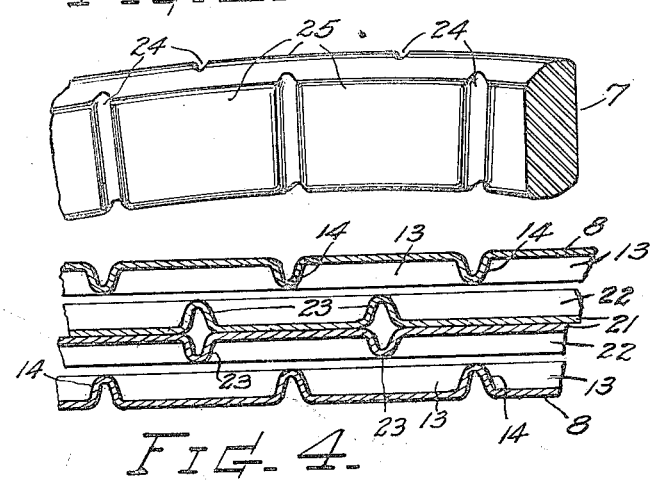
INVENTOR
Harry M. Patch
BY
Pierre Barnes
ATTORNEY Patented June 10, 1924.

1,497,404

UNITED STATES PATENT OFFICE.

HARRY M. PATCH, OF SEATTLE, WASHINGTON, ASSIGNOR TO ELLIS RESILIENT WHEEL CORPORATION, OF SEATTLE, WASHINGTON, A CORPORATION OF WASHINGTON.

RESILIENT WHEEL.

Application filed November 15, 1921. Serial No. 515,194.

*To all whom it may concern:*

Be it known that I, HARRY M. PATCH, a citizen of the United States, residing at Seattle, in the county of King and State of Washington, have invented certain new and useful Improvements in Resilient Wheels, of which the following is a specification.

This invention relates to resilient vehicle-wheels.

The object of the invention, generally stated, is the perfecting of wheels of this character to render the same more efficient, strong and durable.

More specific objects and advantages of the invention will appear in the following specification.

The invention consists in the novel construction, adaptation and combination of parts hereinafter described and claimed.

In the accompanying drawings,—

Figure 1 is a side elevation showing a portion of a wheel embodying my invention. Fig. 2 is a transverse section of the same to an enlarged scale. Fig. 3 is a fragmentary perspective view of one of the elastic members of the wheel. Fig. 4 is a detail sectional view through 4—4 of Fig. 1, the elastic members being omitted.

According to the present invention a wheel consists of two circular members 5 and 6 which are normally held in concentric relations with each other by means of elastic rings 7 housed in opposing recesses provided in said members. The member 5 comprises two disk plate-elements 8 having a central aperture to receive the wheel hub 9 and rigidly secured thereto at opposite ends of a tubular distance piece 10 by means of bolts 11 extending through the hub flange 9¹ and a collar 12.

The plate-elements 8 are pressed or otherwise formed to provide the same, in proximity of their peripheries, with a series of opposing recesses 13, Fig. 4, disposed concentrically of the wheel axis, the adjacent recesses in both of such series being separated from each other by ridges 14. Intermediate the hub and peripheries, said members are formed to provide pairs of apertured conoidal protuberances 15 such as shown in Fig. 2, the complementary protuberances being held in juxtaposition with each other by means of screw bolts 16 extending through the respective protuberances to receive nuts 17.

Each pair of protuberances is reinforced by being seated in the conical cavities of a washer as 18 and, to afford seats for the respective nuts and bolt-heads, conical washers 19 are provided in the cavities of the various protuberances. By connecting the plate-elements 8 to the hub and to each other, as above explained, in a circle at a distance from the hub the parts of the member 5 provide a rigid structure which serves to retain the recessed portions of the respective plate-elements in definite spaced relations with each other.

The second member 6 of my improved wheel is preferably constructed of two annular plate-elements 20 whose inner portions 21 extend into the circumferential interstice between the plate-elements 8 of the member 5 and are also provided with series of recesses 22, Fig. 4, separated by ridges 23.

Said members are resiliently coupled together by means of the elastic rings 7 composed of rubber, or of a composition containing rubber.

As shown in Fig. 3, a ring 7 is provided in its opposite sides with notches 24 to accommodate said plate ridges, and afford intermediate of said notches substantially rectangular projections 25 to engage the respective recesses 13 and 22 of the members 5 and 6.

The notches 24 and projections 25 are, moreover, arranged to have those of one side of a ring spaced at middistance of the corresponding elements of the other side of the ring whereby the material in a ring is most effectually distributed and it regulates said members to have the ridges of one member midway between the ridges of the other member, as shown in Fig. 4.

Adjacent their outer circumferences the plates 20 are formed to provide circumferentially disposed shoulders 26 and peripheral flanges 27 which are spaced to receive therebetween a ring 28 substantially U-shaped in transverse section with the side flanges 29 directed toward the center of the wheel.

The ring 28 constitutes the central member of a three-part rim, the other members of which are provided by the webs 30 of side rings, indicated generally by 31.

The tire 32 of my improved wheel is desirably of rubber or a composition containing rubber, the same being formed to provide complementary center ribs 33 and side ribs 34 which extend inwardly from the tread 35 and are provided adjacent their inner peripheral edges with side ridges $33^1$ and $34^1$.

Annular plates 36 interposed between the flanges 29 of the central rim member 28 and outer rim members 31 are curved, as at $36^1$, to engage over the ridges $33^1$ of the central ribs of the tire.

The ridges $34^1$ of the tire's side ribs are, in turn, engaged by hook shaped portions $31^1$ of the outer rim members. The last named members are furthermore provided with flange elements 37 to engage against the shoulder elements 26 of the respective plates 20 of the wheel member 6.

The rim parts above mentioned and the annular plates 36 are united by means of spaced bolts 38 extending transversely therethrough; and washers, such as 41, are provided upon the bolts between the associated parts at the rim so as to maintain the same in suitably spaced relations.

The tire 32 as described above provides cavities 42 extending circumferentially about the wheel to accommodate expansion and contraction of the ribs 33 and 34 to afford a tire having a high degree of resiliency to eliminate the greater part of road shocks.

By securing the tire, both interiorly and exteriorly thereof, to the wheel the liability of its becoming dislodged is lessened and the strains are distributed more uniformly throughout the tire.

By employing the resilient rings 7 of the character described between the companion plates 8 of the member 5 and the plates 20 of the other member 6 I provide the wheel structure proper with a resiliency which will ensure easy riding and which serves to yieldingly couple the rigid members of the wheel in directions radially and circumferentially of the wheel.

What I claim, is,—

1. In a vehicle wheel, the combination of a hub, a centrally disposed member comprising a plurality of plate elements secured together and rigid with the hub, an outer annular member extending into the space provided between the plate elements of the central member, said members being provided in the overlying portions thereof with opposing recesses divided circumferentially by spaced ridges, a ring of elastic material provided in the complementary recesses of the two members at each side of the outer member, said rings being provided with notches to accommodate the aforesaid ridges whereby the rings serve to yieldingly retain the two members in predetermined relations with each other circumferentially of the wheel.

2. In a vehicle wheel, the combination of a central member comprising a plurality of rigidly connected plates respectively provided with channels adjacent to their outer peripheries, an outer annular member comprising a plurality of rigidly connected plates respectively provided with channels adjacent to the inner peripheries thereof, the channels of both members being corrugated radially of the wheel, and corrugated elastic-rings provided jointly within the channels of both of said members for coupling the same together.

3. In a resilient wheel, the combination of a rigid inner member comprising the hub and spaced disk elements, a rigid outer member comprising the rim element and annular plate elements extending into the space between said disk elements, said disk and annular elements being provided with opposing grooves extending circumferentially of the wheel axis, spaced partitions provided in the respective grooves to divide the same into series of trapezoidal cavities, and elastic bodies extending into the complementary cavities of both the disk and plate elements for keying the wheel members together.

4. In a resilient wheel, an inner member including the wheel hub and spaced disk elements rigid therewith, an outer member including the wheel rim and annular plates rigid therewith and extending into the space between said disk elements, said disk and plate elements being each provided with a continuous circumferentially disposed groove having its inner and outer walls concentric with the axis of the respective member and disposed in diverging directions for the respective groove, partitions provided in said grooves and arranged radially of the wheel axis to afford series of circumferentially disposed cavities for the respective grooves and in opposed relations in the associated wheel members, and rubber bodies provided in the complementary cavities of both members for coupling the latter together.

5. A resilient wheel comprising rigid outer and inner members, said outer member extending into a space provided therefor in the periphery of the inner member, series of cavities provided in opposed relations in the respective members and extending circumferentially thereof, said cavities being of trapezoidal shapes in a plane at right angles to the axis of the wheel and rubber bodies extending into the complementary cavities of said members for keying the latter together.

Signed at Seattle, Washington, this 8th day of November, 1921.

HARRY M. PATCH.

Witnesses:
PIERRE BARNES,
MARGARET G. SUPPLE.